US006898586B1

(12) United States Patent
Hlava et al.

(10) Patent No.: US 6,898,586 B1
(45) Date of Patent: May 24, 2005

(54) SYSTEM AND METHOD FOR DATABASE DESIGN AND MAINTENANCE

(75) Inventors: Marjorie M. K. Hlava, Albuquerque, NM (US); C. Scott Roberts, Albuquerque, NM (US)

(73) Assignee: Access Innovations, Inc., Albuquerque, NM (US)

( * ) Notice: Subject to any disclaimer, the term of this patent is extended or adjusted under 35 U.S.C. 154(b) by 740 days.

(21) Appl. No.: 09/425,532

(22) Filed: Oct. 22, 1999

Related U.S. Application Data (60) Provisional application No. 60/105,401, filed on Oct. 23, 1998.

(51) Int. Cl.[7] .............................. G06F 17/00; G06F 7/00
(52) U.S. Cl. ........................................... 707/1; 707/102
(58) Field of Search ............................... 707/1–10, 102, 707/200, 205; 706/45–48, 60–61; 713/200; 700/2, 10, 86; 709/223–228, 242–243, 200

(56) References Cited

U.S. PATENT DOCUMENTS

| | | | |
|---|---|---|---|
| 5,229,936 A | | 7/1993 | Decker et al. |
| 5,557,794 A | | 9/1996 | Matsunaga et al. |
| 5,619,709 A | * | 4/1997 | Caid et al. ..................... 704/9 |
| 5,630,125 A | * | 5/1997 | Zellweger .................. 707/103 |
| 5,634,051 A | | 5/1997 | Thomson |
| 5,682,330 A | | 10/1997 | Seaman et al. |
| 5,774,888 A | | 6/1998 | Light |
| 5,799,308 A | | 8/1998 | Dixon ......................... 707/100 |
| 5,819,251 A | | 10/1998 | Kremer et al. ................. 707/1 |
| 5,832,499 A | | 11/1998 | Gustman .................... 707/103 |
| 5,867,799 A | | 2/1999 | Lang et al. .................... 707/1 |
| 6,327,586 B1 | * | 12/2001 | Kisiel |

* cited by examiner

Primary Examiner—Alford Kindred
(74) Attorney, Agent, or Firm—Jeffrey D. Myers; Peacock, Myers & Adams, P.C.

(57) ABSTRACT

A database design and maintenance system and method includes a software suite designed to assist users with creating, storing, updating and reusing full-text and bibliographic databases. The software suite includes three components configured to operate on any Java-enabled server. The first component is an intranet system for document entry, editing, and viewing. The second component is an indexer that includes concept extracting, statistical collecting, and rule building functionality. For example, when a text document is entered into the intranet system, the concept extractor scans the document to determine appropriate subject terms for identifying the document. These subject terms are reviewed by a human indexer and assigned to the document. The statistical collecting function analyzes the concept extractor's performance in finding appropriate indexing terms and maintains a record of the hits, misses, and noise. If a term is consistently missed by the concept extractor, the rule building function of the indexer creates a new rule for finding appropriate indexing terms. The third component is a thesaurus management system that allows users to write and manage their own vocabulary of specialized terms, or expand upon an existing thesaurus employed in the database design and maintenance system. Thus, if the statistical collecting function of the indexer shows the need for a subject term that is not included in the thesaurus, the subject term can be entered into the thesaurus. The database design and maintenance system and method brings together technology and protocols for an entirely different approach to text, taxonomy and catalog management.

16 Claims, 8 Drawing Sheets

SYSTEM AND METHOD FOR DATABASE DESIGN AND MAINTENANCE

This application claims the benefit of U.S. Provisional Application No. 60/105,401, filed Oct. 23, 1998, and entitled "DATABASE DESIGN AND MAINTENANCE SYSTEM," which is incorporated herein by reference.

BACKGROUND OF THE INVENTION

1. Field of the Invention

The present invention relates generally to a database system, and more particularly to a database design and maintenance system and method that includes a software suite designed to assist users with creating, storing, updating and reusing full-text and bibliographic databases.

2. Description of the Related Art

In the digital age, a growing number of companies are realizing the need to better organize their information. Many of these companies have accumulated a vast amount of information and data over the years, typically in paper form. Storing this information has required many companies to rent additional storage space for documents that cannot be destroyed or must otherwise be retained. Consequently, locating necessary documents from storage files has become a complex, cumbersome and often time-consuming task. If documents or files are misplaced, the chance of finding the desired information is low.

Many companies have digitized their information to store in a database. This information is typically available through a network to facilitate multiple user access. However, data storage and retrieval in the digital age continues to be problematic due to differences in platforms, systems, proprietary formats, and media. These differences make it difficult to effectively store and retrieve large volumes of data. For example, some database management systems are not configured to handle variable length fields to facilitate input of textual data. In addition, use of different software tools for managing database functionality often create compatibility issues. That is, many software components necessary for effective database management typically fall short of performing seamlessly for the user. These problems may require the database to be inactive for repair and maintenance. Any such downtime could considerably affect a company that relies on its database in the normal course of business.

In view of the foregoing, there is a need for a system and method that simplifies database design and maintenance by offering seamless integration of software tools to effectively store and retrieve data.

SUMMARY OF THE INVENTION

Embodiments consistent with the present invention address the foregoing needs with a database design and maintenance system and method that includes a software suite designed to assist users with creating, storing, updating and reusing full-text and bibliographic databases. The software suite includes three components configured to operate on any Java-enabled server. The first component is an intranet system for document entry, editing, and viewing. The second component is an indexer that includes concept extracting, statistical collecting, and rule building functionality. For example, when a text document is entered into the intranet system, the concept extractor scans the document to determine appropriate subject terms for identifying the document. These subject terms are reviewed by a human indexer and assigned to the document. The statistical collecting function analyzes the concept extractor's performance in finding appropriate indexing terms and maintains a record of the hits, misses, and noise. If a term is consistently missed by the concept extractor, as determined by the statistical collector, the rule building function of the indexer creates a new rule for finding appropriate indexing terms. The third component is a thesaurus management system that allows users to write and manage their own vocabulary of specialized terms, or expand upon an existing thesaurus employed in the database design and maintenance system. Thus, if the statistical collecting function of the indexer shows the need for a subject term that is not included in the thesaurus, the subject term can be entered into the thesaurus. A feedback loop is created by the repetition of this process, ensuring that changes in the database vocabulary are reflected during retrieval of information.

An aspect of the invention provides a database design and maintenance system, comprising a database management means for storing textual data in a storage device, the database management means having a user interface to facilitate entry, editing and viewing of the textual data; an indexing means in communication with the database management means for indexing the textual data entered into the database management means; and a thesaurus means in communication with the database management means for managing a vocabulary of terms related to the textual data.

Another aspect of the invention provides a method for maintaining a database, comprising the steps of generating a graphical user interface; receiving textual data; determining at least one indexing term to associate with the textual data for storage and retrieval; displaying at least one indexing term for user selection; associating the selected indexing term with the textual data; and storing the textual data in a storage device.

BRIEF DESCRIPTION OF THE DRAWINGS

The accompanying drawings, which are incorporated in and constitute a part of the specification, illustrate presently preferred embodiments of the invention and, together with the preceding general description and the following detailed description, explain the principles of the invention.

In the drawings.

DETAILED DESCRIPTION OF THE INVENTION

Figure 1:
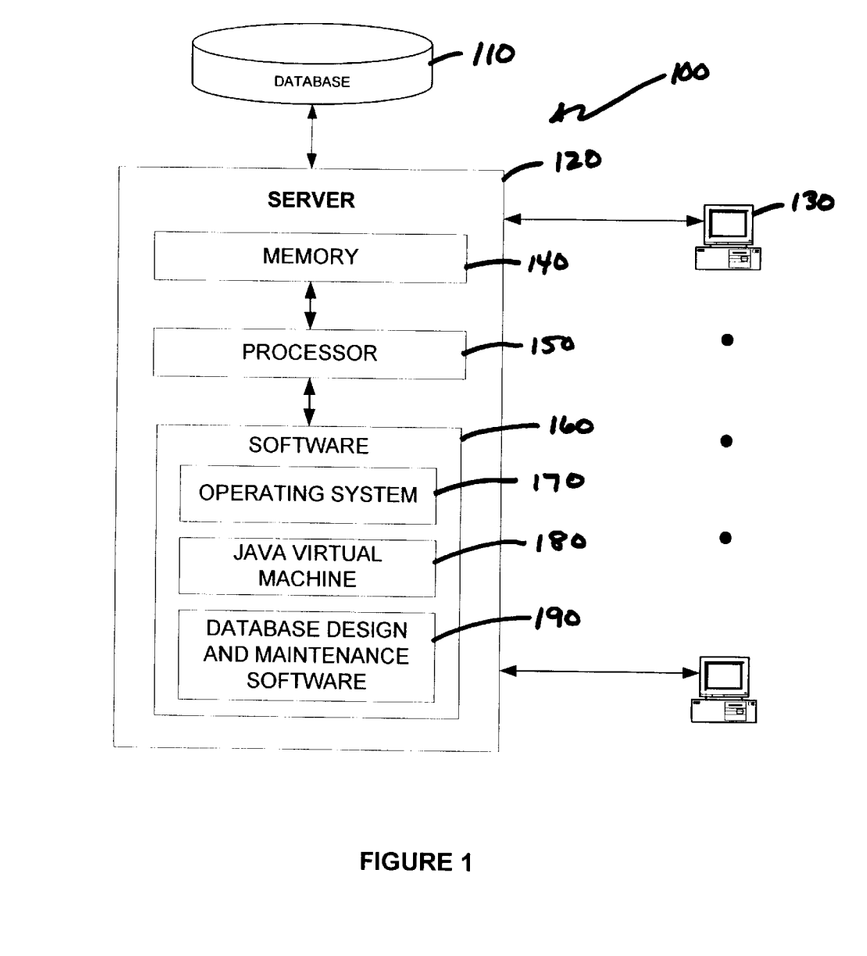
FIG. 1 is a diagram of a database design and maintenance system consistent with the present invention.

FIG. 1 is a diagram of a database design and maintenance system 100 consistent with the present invention. System 100 includes a group of components that may be configured to transfer data over a wide area network (WAN) (e.g., the Internet) or a local area network (LAN) (e.g., an intranet). For purposes of illustration, system 100 includes a data storage device 110 (i.e., a database), a server 120 and end terminals 130 for intranet or Internet applications. One skilled in the art will appreciate that system 100 may have many different configurations depending on the desired database environment.

Data storage device 110 serves as a database for information stored and retrieved on system 100. Data storage device 110 may be any commercially available data storage device that facilitates high-speed access and retrieval of stored data (e.g., an optical disc storage device). System 100 may include one or more data storage devices depending on the anticipated volume of data for storage.

Server 120 includes a memory 140, a processor 150 and a storage device 160 for software applications. Server 120 operates to control the flow of information between data storage device 110 and end terminals 130 and may be a commercially available server (e.g., a Sun Solaris® server). Memory 140 is preferably random access memory (RAM) (e.g., 64 megabytes). The amount of memory necessary for optimal server 120 performance may vary depending on the configuration of system 100. Processor 150 is preferably a high-speed processor (e.g., at least 200 Mhz), such as a Pentium® processor manufactured by Intel Corporation. Processor 150 communicates with memory 140 and storage device 160 to control the operation of server 120. Storage device 160 is a hard drive or other data storage device capable of storing software applications, including an operating system 170, Java® virtual machine 180, and database design and maintenance software 190.

Operating system 170 may be a Linux, Macintosh, Windows NT, Unix, Solaris or other operating system capable of running on servers. Including Java virtual machine 180 in storage device 160 ensures that server 120 is a Java-enabled server for intranet and Internet applications. Database design and maintenance software 190 facilitates storage and retrieval of information between data storage device 110 and end terminals 130 (e.g., desktops computers). A detailed discussion of database design and maintenance software 190 begins with FIG. 2 described below.

Figure 2:
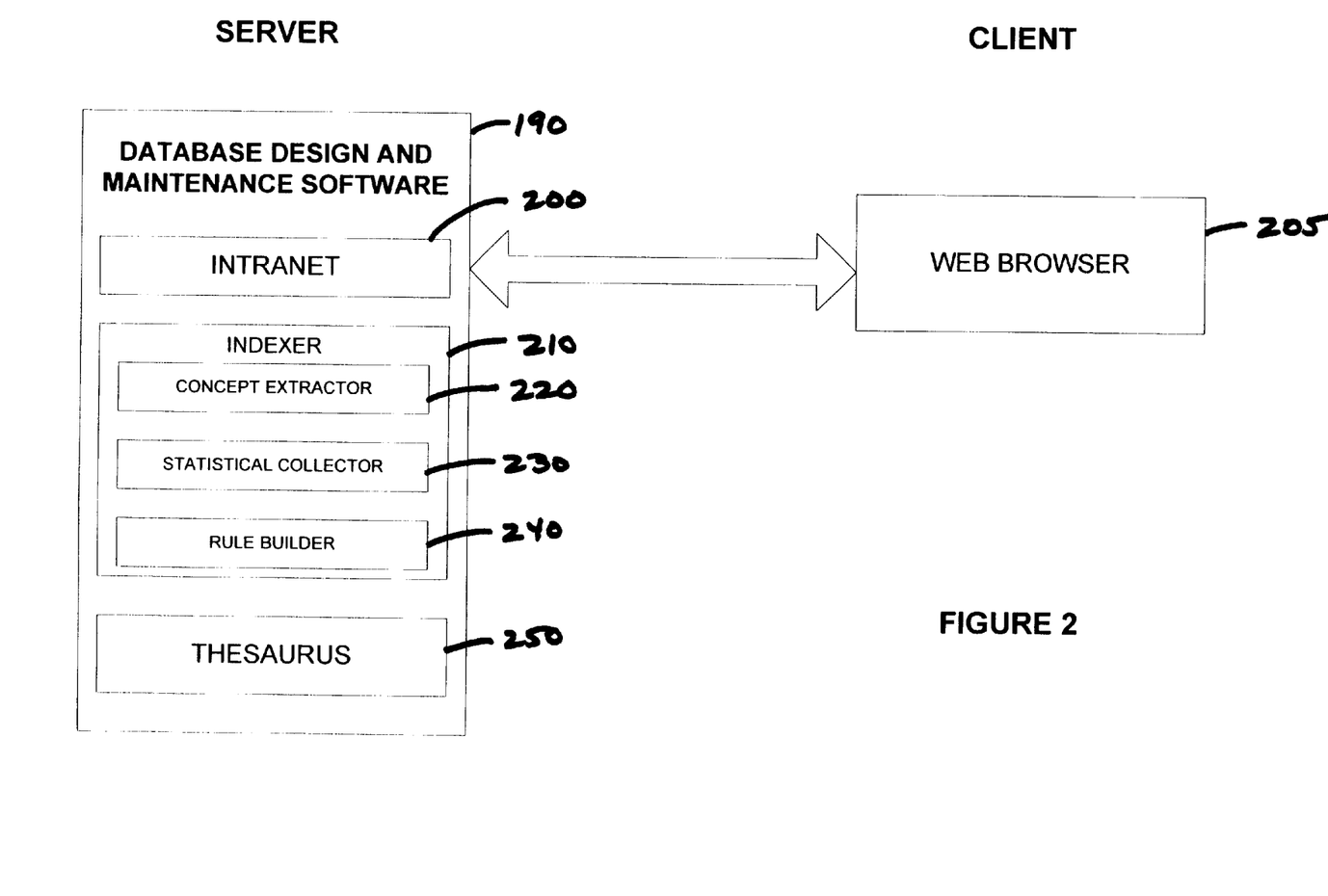
FIG. 2 is a block diagram of software components included in a database design and maintenance system consistent with the present invention.

FIG. 2 is a block diagram of software components included in database design and maintenance software 190 consistent with the present invention. Software 190 preferably includes a plurality of software components, each of which provides a specific function of system 100. These software components include an intranet software module 200, an indexer software module 210, and a thesaurus software module 250. These software modules are configured to operate independently or in harmony depending on the database application environment.

Intranet software module 200 includes a document management tool configured to handle variable length textual data. Preferably, intranet software module 200 is written in Java and uses Extensible Markup Language (XML) to store and transmit data over system 100 (e.g., using TCP/IP protocol). XML may also be used to configure each database in system 100. XML permits intranet software module 200, for example, to output data over the Internet or for typesetting. Intranet software module 200 generates a graphical user interface (GUI) either at the server or client terminals that is viewable, for example, through a web browser 205 that runs Java applets. The GUI permits administrators to edit server functions and nested data structures associated with XML documents. The GUI further supports data entry, viewing, editing, sorting and other text management functions. As a modular based application, intranet software module 200 can generate application-specific viewing and editing screens, without additional programming.

The GUI of intranet software module 200 preferably supports a plurality of interactive functions. For example, the GUI can generate an edit screen for entering new data into system 100. The edit screen may include several fields for entering data, such as single value fields, multi-value fields, free text fields and subfields. Single-value fields accept only one entry while multi-value fields hold more than one entry. Free text fields require no specific codes or guidelines for the entered data values and are generally used for information written in paragraph format (e.g., abstracts and notes fields). Subfields are new multi-value fields for entering an additional layer of information into system 100. A subfield may include single-value fields, multi-value fields, free text fields, or additional subfields. Upon entering data into the appropriate fields, a user can select an indexing function of database design and maintenance software 190 via the GUI.

Indexer software module 210 enables human indexers to increase their indexing efficiency and consistency. In particular, indexer software module 210 facilitates selection of terms from a variety of database sources, such as controlled vocabularies, authority files, or thesauri. When new data in entered into system 100, indexer software module 210 generates a list of approved indexing terms for selection thus, eliminating the need to manually generate indexing terms. To provide full indexing functionality, indexer software module 210 includes a plurality of software tools, including a concept extractor 220, a statistical collector 230, and a rule builder 240. A detailed description of these software tools is provided below with respect to FIGS. 4–6.

To aid in determining appropriate indexing terms for new textual data, database design and maintenance software 190 includes a thesaurus software module 250 for associating related vocabulary terms with subject terms. For example, if a suggested indexing term is "music," activating the thesaurus through the GUI may provide additional vocabulary terms, such as "Musician," "Music history," and "Musical instruments." In addition, thesaurus software module 250 enables users to manage their own vocabulary of specialized terms, or to use and expand upon an existing thesaurus obtained from an external source. In addition, thesaurus software module 250 facilitates management of structured vocabularies from a complete thesaurus to authority files, and may be used independently, or with intranet software module 200 and indexer software module 210. Preferably, thesaurus software module 250 includes "broader term" and "narrower term" hierarchical structures, "use" and "used for" references, and "history," "related terms," and "scope notes" functionality for different applications. A more detailed discussion of thesaurus software module 250 is provided below with reference to FIGS. 7–8.

Additional features of intranet software module 200 include searching functions. For example, intranet software module 200 permits users to search for records already stored in the database. The search function may be activated from any of the entry fields described above or a global search may be implemented to automatically search all data entered into each of the entry fields. The GUI of intranet software module 200 displays the search results, including "hit" information such as the title and record number of the stored data. One skilled in the art will recognize that intranet software module 200 may include additional features to facilitate database design and maintenance as described herein.

Figure 3:
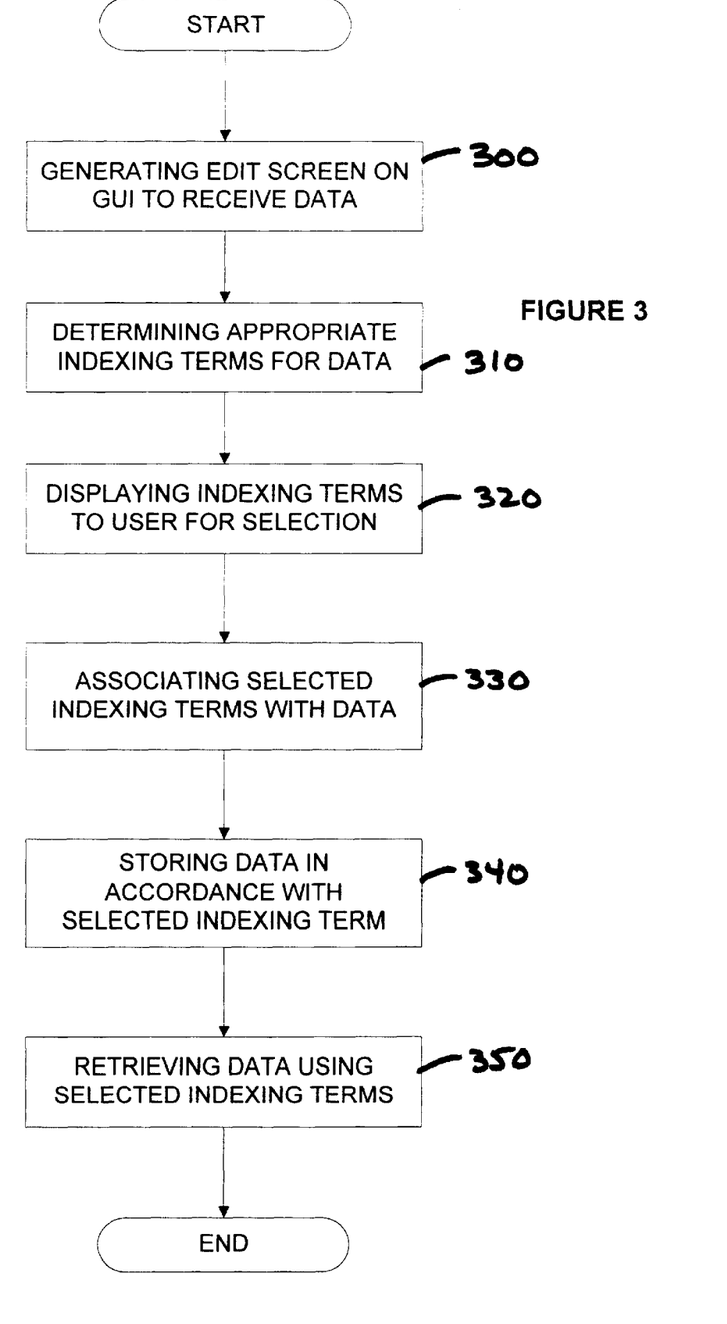
FIG. 3 is a flowchart of a method for implementing an intranet software component of the database design and maintenance system consistent with the present invention.

FIG. 3 is a flowchart of a method for implementing intranet software module 200 of database design and maintenance system 100 consistent with the present invention. The method begins with the step of generating an edit screen on the GUI to receive data (step 300). More specifically, the edit screen is configured to receive textual data in one or more fields generated on the edit screen. Once the textual information is entered into the edit screen, the user can select an indexing function which determines appropriate indexing terms for storing the data (step 310). The indexing terms are subsequently displayed to the user for selection (step 320). The user can either select from the list of suggested terms or input her own indexing terms for storing the data. The selected terms are then associated with the data (step 330), which is stored in accordance with the indexing term (step 340). Once stored, the data can be easily retrieved through the GUI simply be using the indexing term associated with the desired data (step 350).

Figure 4:
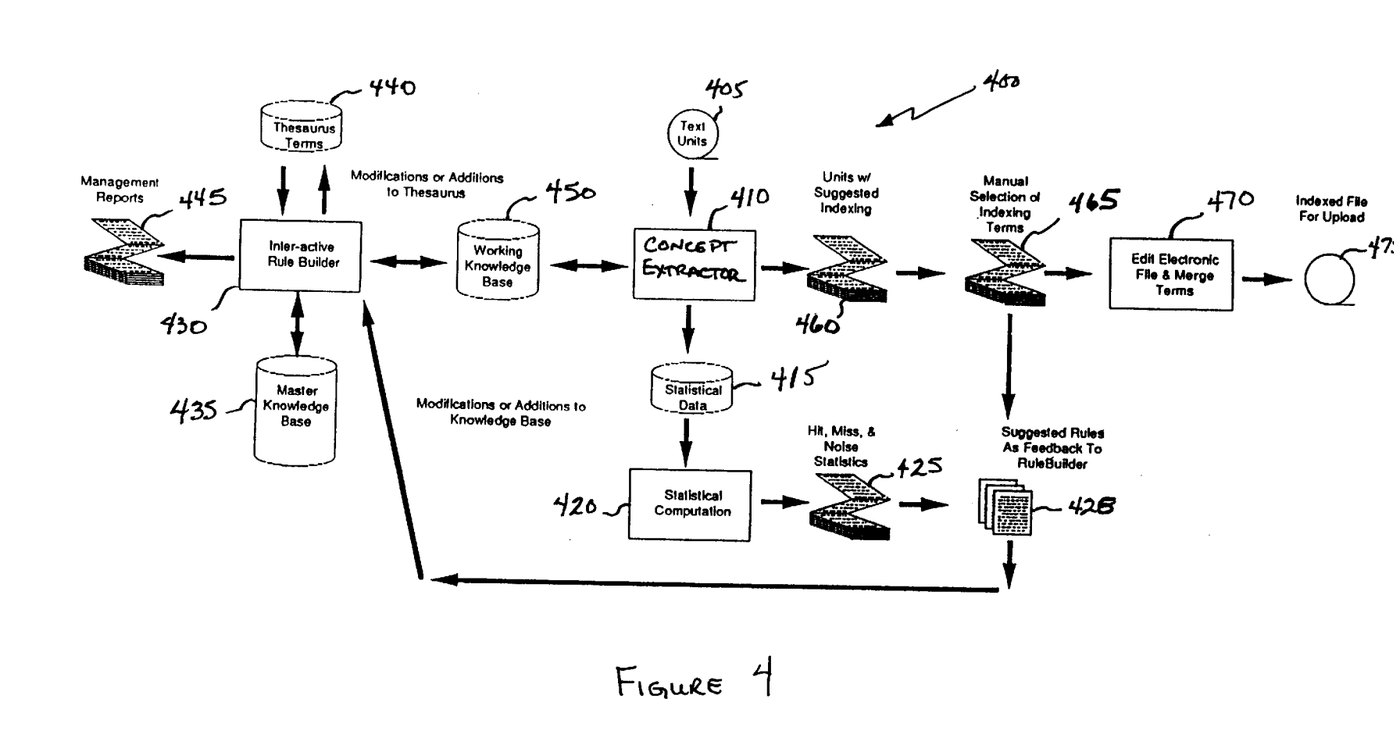
FIG. 4 is a flow diagram of an indexing software component of the database design and maintenance system consistent with the present invention.

FIG. 4 is a flow diagram 400 of indexer software module 210 of database design and maintenance software 190 consistent with the present invention. Flow diagram 400 begins with entering textual data into system 100, through the GUI of intranet software module 200 (step 405). The textual data is then sent to concept extractor 220 which determines appropriate indexing terms for the textual data using a rule-based system described below (step 410).

The initial screen of indexer software module 210 preferably displays multiple options to the user, including "Get Previous Statistics", "Make Statistics," "Edit Rules," and "Search Rules." One skilled in the art will recognize that additional options may be offered to the user on the initial screen of indexer software module 210.

Selecting the "Get Previous Statistics" option displays a list of previously generated batches of statistical data generated by statistical collector 230 (step 415). A batch is a group of database documents with hit, miss, and noise statistics. "Hit" statistics refers to a list of suggested indexing terms selected by the user. "Miss" statistics refers to a list of indexing terms indexer software module 210 did not suggest, but were manually selected by the user. "Noise" refers to a list of indexing terms indexer software module 210 did suggest, but were not selected by the user. Preferably, on the Statistics display, statistics are sorted with the term with the most misses or noise at the top. After each term, the number of times it was missed (in the case of misses) or suggested (in the case of noise) is provided.

Selecting a displayed statistical term preferably opens a Term display. Whether the term is related to "Miss" or "Noise" statistics is indicated on the Term display. The Term display further shows each database document where the selected term is being considered. For example, "Key: 0458363 Editor: vince" indicates that document number 0458363, created by the editor Vince, contains a miss or a noise (depending on what was selected).

Selecting a database document via the Term display will preferably open a Document display which includes (a) document information (e.g., title, series title, and abstract); (b) suggested terms, the rule it used to invoke each term, and the number of times indexer software module 210 accessed that rule (e.g., "History of film—(2) history(1) film(1)"); (c) a list of used terms, or terms the user chose to index the record; and (d) all the options needed to edit the rule base (e.g., an Enter Rule field and New Rule, Search RuleBase, Retry, and Back options). The Enter rule field permits a user to enter an existing rule for display. The New Rule option allows a user to create a new rule. The Search RuleBase option allows the user to search for an existing rule. The Retry option compares the current document with new rules created by the user. The Back option exits the existing GUI.

The Make Statistics option uses statistics collected by statistical collector 230 to create a batch (step 420). That is, this option uses all the documents created by indexer software module 210 since the last computation of statistics. A list of prior "Hit," "Miss," and "Noise" statistics may be generated by statistical collector 230 in the manner described above using the Get Previous Statistics option (step 425).

The Edit Rules option generates a display with preferably a text-to-match field, a rule field, and selection options. From this display, a user can enter text-to-match information in the text-to-match field for a new rule and enter the body of the rule in the rule field. Upon entering the foregoing information, indexer software module 210 preferably allows the user to select from several options (e.g., Check Rule, Save, Quit, Quit without Saving, Search Rules, and Delete Rules). To make a new rule with the same body as an existing rule, but a different text-to-match, a user can display the existing rule and change the text in the text-to-match field. In this instance, a new rule is created without modifying the old one. Also, once a rule is deleted, the text does not disappear immediately from the screen.

The Search Rules option creates a search display that preferably provides the user with multiple search options (e.g., "Matching Text" and "Subject Term" options). A Matching Text option, for example, searches for text that appears in the text-to-match. A Subject Term option, for example, displays a list of rules that invoke a specified subject term. Any rules that are modified by the user subsequent to a search, or newly created by the user as set forth above, may be suggested to rule builder 240 as feedback (step 428). The suggested rules are sent to rule builder 240 (step 430).

Rule builder 240 is an interactive application that uses information from a master knowledge base (step 435) and thesaurus software module 250 (step 440) to develop rules for generating indexing terms for the storage and retrieval of data. The master knowledge base includes a vast collection of vocabulary terms, grammatical rules and other information which permits database design and maintenance software 190 to recognize and grammatically interpret new data. Thesaurus software module 250 includes a database of thesaurus terms that associates related terms to subject terms suggested by the batch mode indexer engine. Rule builder 240 uses the thesaurus terms to create a broader range of indexer rules for generating a broad range of suggested indexing terms for the user to select.

An indexer rule preferably includes a "text-to-match" component and a "body" component. The text-to-match component is a string of text the indexer engine searches for in either the abstract, title, or series title of a record, in order to invoke a rule. The body of the rule includes the conditions the record must satisfy in order to suggest an indexing term. Rule builder module 240 preferably includes IDENTITY rules, SYNONYM rules, IF rules, IF-ELSE rules, IF-ELSE-IF rules, IF—IF rules, TRUNCATION rules, COMPOUND rules, NOT rules, and NULL rules.

IDENTITY rules are rules where the text-to-match and the thesaurus term are identical. These rules can be generated programmatically from a controlled vocabulary. For example, for a text-to-match component of "guam," rule builder 240 may generate an identity rule, such as "USE Guam." The text after USE should be worded exactly like the thesaurus term, including capitalization. In the text-to-match component, capitalization may be ignored, and plurals and singulars may be implied. For example, if the text-to-match is "dog," indexer software module 210 will match "dog" and "dogs." Conversely, if the text to match is "cats," indexer software module 210 will match "cats" and "cat."

SYNONYM rules are essentially the same as Identity rules, except the text-to-match and thesaurus term are different. For example, if the text-to-match term is "burglary," rule builder module 240 may generate a Synonym rule, such as "USE Theft."

IF rules preferably include a set of conditions (e.g., a string of words) that must be met, or that the entered text must contain, in order for the indexing term to be invoked. Preferably, the IF statement is closed with an ENDIF command. Along with the IF statement, there should be a proximity indicator to prompt indexer software module 210 where to search for these conditions in relation to the text-to-match. The three proximity indicators preferably are NEAR, WITH, and MENTIONS. Examples of IF rules are provided below.

---

NEAR requires the condition to occur within three words of the text to match.
```
        text to match: building
        IF (NEAR "security")
            USE Crime prevention
        ENDIF
```

In this example, if "security" occurs within three words of "building," use the thesaurus term "Crime prevention."

---

WITH requires the condition to occur anywhere within the same sentence as the text to match.
```
        text to match: hospitals
        IF (WITH "psychiatric")
            USE Mental health facilities
        ENDIF
```

In this example, if "psychiatric" occurs within the same sentence as "hospitals," the indexing term "Mental health facilities" is used.

---

MENTIONS requires the condition to occur anywhere within the abstract, title, or series title.
```
        text to match: theater
        IF (MENTIONS "improvisational")
            USE Experimental theatre
        ENDIF
```

In this example, if "improvisational" occurs within the same record as "theater," the indexing term "Experimental theatre" is used. Conditions may be imposed on the IF rules, such as requiring the text-to-match to be in all capital letters or to begin a sentence.

With IF-ELSE rules, preferably ELSE is used to offer the user a variety of other options. Thus, if the initial IF statement is false, indexer software module 210 provides an alternative term. An example of the IF-ELSE rules is set forth below.

---

```
        text to match: norwegian
        IF (MENTIONS "language")
            USE Norwegian language
        ELSE
            USE Norway
        ENDIF
```

That is, if the record contains the word "norwegian," and the word "language" occurs anywhere within that same record, the phrase "Norwegian language" should be used as the indexing term. However, if the record doesn't contain the word "language," the term "Norway" should be used instead. For IF-ELSE rules, indexer software module 210 will present the user with either "Norwegian language" or "Norway," but not both.

For IF-ELSE-IF rules, another set of conditions (i.e., a second IF statement) is added to the IF-ELSE rule. The following is an example of the IF-ELSE-IF rule.

---

```
        text to match: norwegian
        IF (MENTIONS "language")
            USE Norwegian language
        ELSE IF (MENTIONS "country")
            USE Norway
        ENDIF
        ENDIF
```

If the record does not contain the word "language," indexer software module 210 will not automatically use the term "Norway." The additional IF statement, in this example, requires that the word "country" be mentioned before "Norway." For IF-ELSE-IF rules, indexer software module 210 will present the user with "country" or "Norway," but not both.

An IF—IF rule may be used to prompt indexer software module 210 to suggest both "Norway" and "Norwegian language" to the user as possible indexing terms. For example, to suggest both indexing terms to the user, the rule may be written as two separate statements (i.e., an IF—IF rule).

---

```
        text to match: norwegian
        IF (MENTIONS "language")
            USE Norwegian language
        ENDIF
        IF (MENTIONS "country")
            USE Norway
        ENDIF
```

In this example, the placement of the ENDIFs and the lack of an ELSE is important. Once indexer software module 210 encounters the first ENDIF, it stops. When indexer software module 210 encounters the second IF, it starts over again, treating the statement as a new rule. Indexer software module 210 may be programmed to include a variety of conditions and other parameters to achieve the desired results (e.g., to use "Norway" or "Norwegian language" or both depending on specified conditions).

For TRUNCATION rules, an asterisk may be used to indicate truncation. Truncation may be allowed to the left, to the right, or between words, but not in the middle of a word, and not as the first or last word. So, for example, using the TRUNCATION rule, "teach*" will match "teach," "teaching," "teacher," and other words with "teach" as the prefix. In addition, the term "*ware" will match "software," "hardware," "kitchenware," "beware," and other terms with "ware" as a suffix. Moreover, the phrase "drinking * driving" will match "drinking and driving," "drinking while driving," and "drinking phone driving." In this example, the asterisk between words only represents one word. The following is an example of the TRUNCATION rule.

---
text to match: grow*
IF (WITH "crystal*")
    USE Laboratory techniques
ENDIF
---

COMPOUND rules preferably operate in the same way as the foregoing rules, except that COMPOUND rules provide more options within each IF statement. For example, text strings are separated by OR or AND to either broaden or narrow the matching criteria. OR requires that at least one of the conditions be true in order to be evaluated as true. The following is an example using OR.

---
text to match: geometry
IF (WITH "plane" OR WITH "euclid*")
    USE Euclidean geometry
ENDIF
---

Thus, using COMPOUND rules, if "plane" is in the same sentence as "geometry," or "euclid" is in the same sentence as "geometry," indexer software module 210 will suggest "Euclidean geometry" to the user as an indexing term. AND requires that both (or all) of the conditions are true in order to be evaluated as true. The following is an example using AND.

---
text to match: geometry
IF (WITH "plane" AND WITH "euclid*")
    USE Euclidean geometry
ENDIF
---

In this example, the IF statement requires both "plane" and "euclid" to be in the same sentence as "geometry" in order for indexer software module 210 to suggest "Euclidean geometry." For COMPOUND rules, an IF statement can contain as many ORs or ANDs as needed. These connectors can even be combined as shown in the following example.

---
text to match: psychological
IF (WITH "disorder" OR WITH "problem")
    AND (WITH "treatment" OR WITH "care"))
    USE Treatment of psychological disorders
ENDIF
---

Thus, in this example, if either "disorder" or "problem" occurs in the same sentence as "psychological," and either "treatment" or "care" also occurs in that sentence, indexer software module 210 will suggest to the user "Treatment of psychological disorders" as an indexing term.

For NOT rules, NOT can be used before MENTIONS, WITH, or NEAR, to indicate that indexer software module 210 will only suggest an indexing term if the string does not occur within a specified proximity. The following is an example of a NOT rule.

---
text to match: bear
IF (NOT NEAR "chicago")
    USE Wild animals
ENDIF
---

In this example, indexer software component will only suggest "Wild animals" to the user as an indexing term if "bear" and "Chicago" are not within three words of each other. NOT statements may get more complicated when they are also compound statements. The AND connector may be used to get the same effect that the OR connector has provided in other statements. An example of this condition follows.

---
text to match: animation
IF (NOT WITH "includes" AND NOT
        WITH "contains")
    USE Animated photography
ENDIF
---

In the foregoing example, indexer software module 210 will suggest "Animated photography" to the user only if neither "includes" nor "contains" appears in the same sentence as "animation." The reason an AND is used instead of an OR is based on the Boolean definitions of AND and OR. An AND statement is true only if both (or all) parts of the statement are evaluated as true. An OR statement is true if just one part is evaluated as true.

Indexer software module 210 uses the NULL rule to ignore a string of text in a record (i.e., not use the text string as a text-to-match). An example of the NULL rule is provided below.

---
text to match: set in motion
NULL
---

In this example, when indexer software module 210 encounters the phrase "set in motion," it will not use the word "set" to match the indexing term. An implied NULL rule may be used with an IF-ELSE statement by eliminating the USE command. An example of an implied NULL rule is as follows.

text to match: segments

---
IF (NEAR "film" OR NEAR "video" OR
        NEAR "movie")
ELSE
    USE Segments
ENDIF
---

After creating a rule consistent with the foregoing, rule builder 240 may generate management reports which may include a variety of information, such as a list of the existing rules and the number of times each rule has been used (step 445).

After rule builder 240 has developed developed new rules for generating additional indexing terms to suggest to users, the new rules and terms are added to a working knowledge base (step 450). The working knowledge base is periodically updated with new or modified rules and terms in order to adapt to a particular user environment. That is, a working knowledge base consistent with the present invention enables indexer software module 210 to "learn" as new documents are entered into the database of system 100. The batch mode indexer engine can access the working knowledge base when receiving new documents into system 100.

Using the updated working knowledge base, the batch mode indexer engine can display suggested indexing terms for newly received data (step 460). The user can then choose from the suggested indexing terms generated by indexer software module 210 or manually enter different terms. (step 465). If the user chooses to manually enter indexing terms and thus, not choose the automatically generated terms, the new terms are forwarded to rule builder 240 for analysis and for generating new rules for subsequent documents entered into the database of system 100 (step 428). If the user selects the terms suggested by indexer software module 210, the electronic file created for the newly entered data is edited to include the selected indexing term or terms (step 470). The terms are merged before storing the new data into the database of system 100 to ensure that any of the selected terms may be entered by a user to retrieve the stored data. The indexed electronic file with the data and indexing terms is then uploaded into data storage device 110 (step 475).

Figure 5:
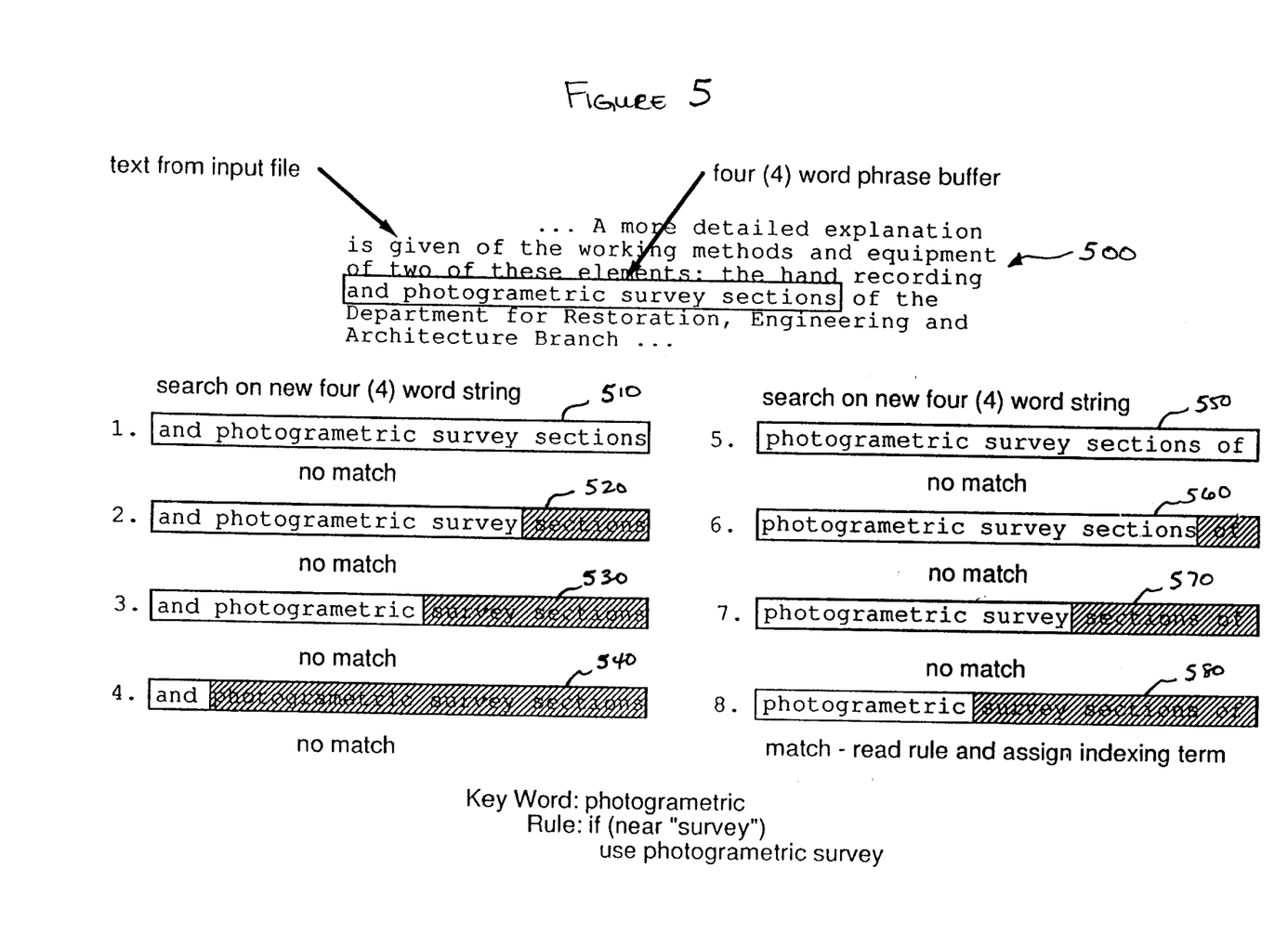
FIG. 5 is an example of an indexing search routine consistent with the present invention.

FIG. 5 is an example of an indexing search routine consistent with the present invention. This example illustrates entry of new textual data into system 100. Indexer software module 210 includes concept extractor 220 to extract concepts from text data entered into intranet software module 200. As illustrated in FIG. 5, concept extractor 220 identifies a first four-word phrase in the input file which includes a keyword "photogrametric." Concept extractor 220 first buffers the phrase "and photogrametric survey sections" and attempts to extract a subject term that satisfies a rule in the master knowledge base (step 500). A search is initiated by indexer software module 210 to match the buffered string with existing text in the master knowledge base (step 510). Indexer software module 210 deletes the last word in the text string and again compares the remaining phrase with the master knowledge base (step 520). Indexer software module 210 deletes any additional words (steps 530 and 540) and compares the remaining text with the master knowledge database, respectively. If no match is found with the last remaining word, a second four-word phrase including "photogrametric" is buffered (step 550). Indexer software module 210 repeats the foregoing iterative process (steps 560 and 570) until a match is found (step 580). After the match is found, the rule associated with the keyword is read and the appropriate indexing term is assigned to the new input file.

Figure 6:
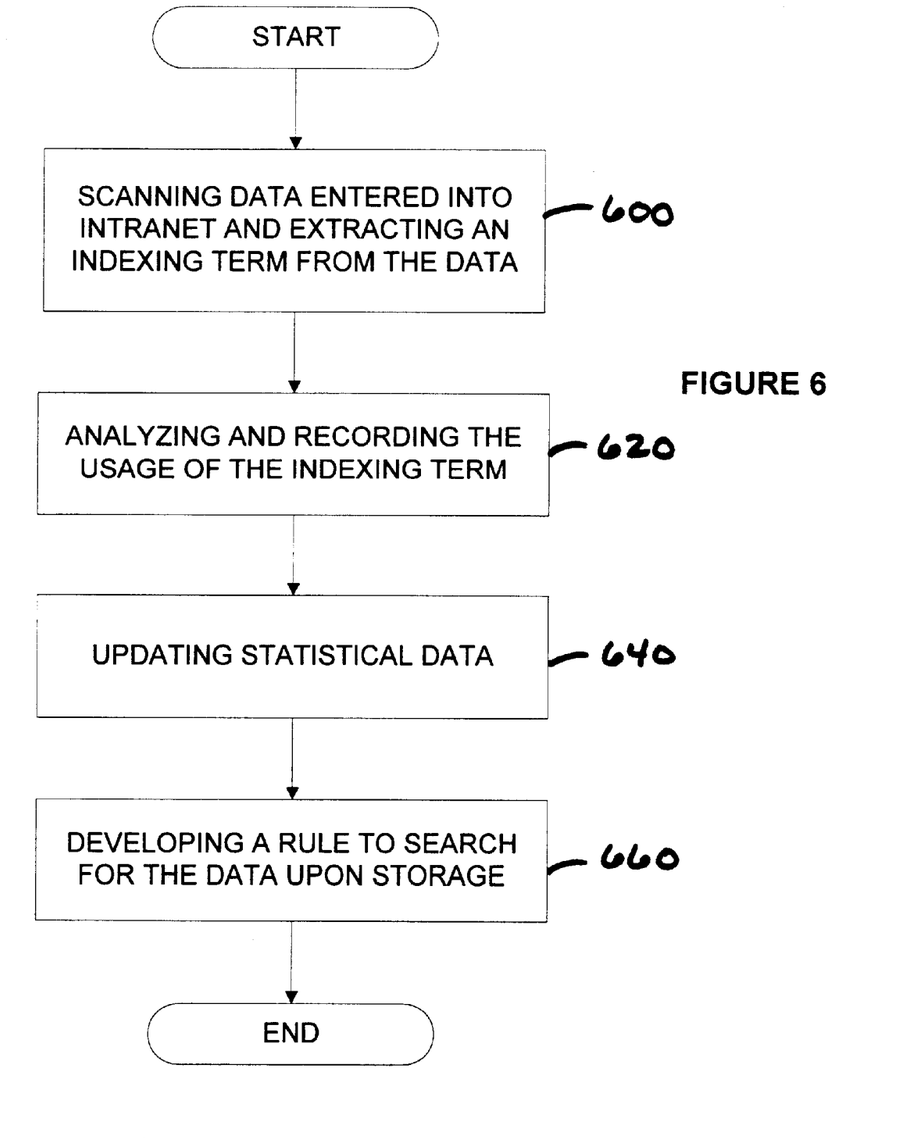
FIG. 6 is a flowchart of a method for implementing an indexing software component of the database design and maintenance system, consistent with the present invention.

FIG. 6 is a flowchart of a method for implementing indexer software module 210 of database design and maintenance system 100, consistent with the present invention. The method begins with scanning data entered into intranet software component 200 and extracting an indexing term therefrom (step 600). This step is performed by concept extractor 220. The next steps include analyzing and recording the usage of the indexing term for statistical data (step 620) and updating the statistical data (step 640). These steps are performed by statistical collector 230. A rule to search for the stored data is then implemented, if it currently exists, or is developed to search for the data upon storage (step 660). One skilled in the art will appreciate that additional steps may be taken by indexer software module 210 to achieve a desired operation consistent with the present invention.

Figure 7:
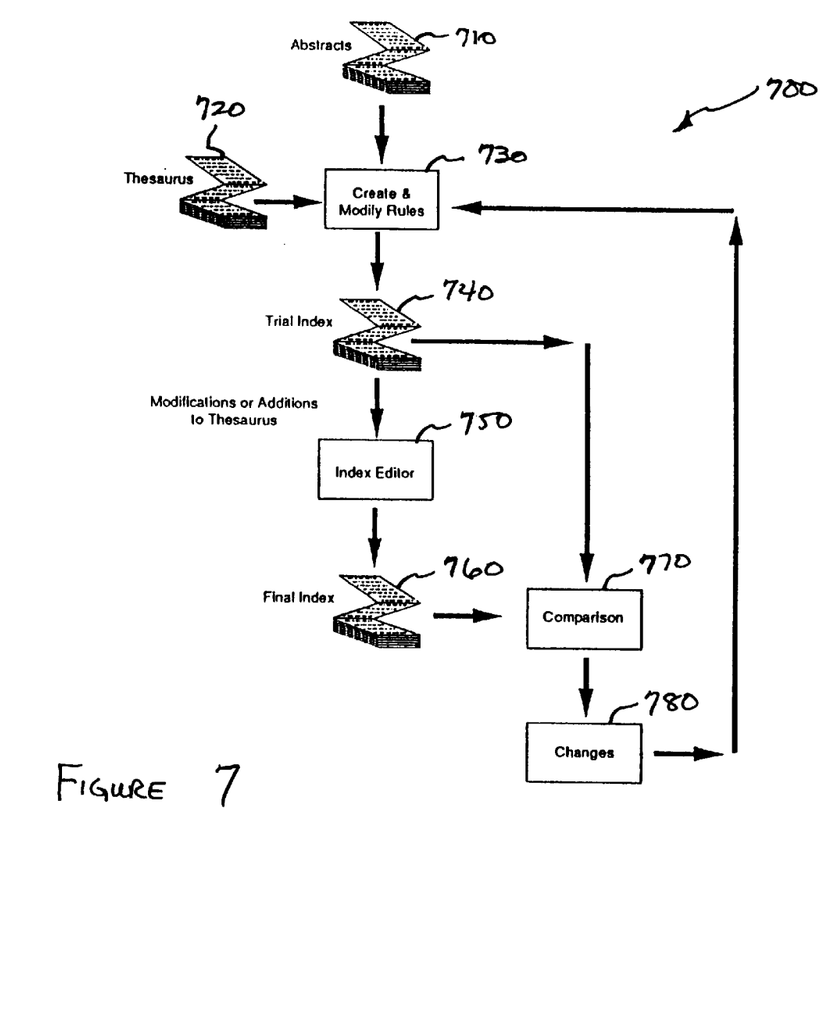
FIG. 7 is a flow diagram of a knowledge base function of a database design and maintenance system consistent with the present invention.

FIG. 7 is a flow diagram of a knowledge base function of database design and maintenance system consistent with the present invention. The flow diagram begins with entering textual data into intranet software module 200 (step 710). Thesaurus terms may also be entered into an existing thesaurus database or used to create a new thesaurus database (step 720). The thesaurus database includes subject terms and relationships between terms stored in a hierarchical or controlled vocabulary format. The thesaurus database is created, maintained and organized by thesaurus software module 250 which is accessible through the GUI generated by intranet software module 200. Upon selecting the thesaurus function through the GUI, a Thesaurus display is preferably generated which allows the user to add, delete, change terms in the thesaurus database. The user may also move terms to different places in the hierarchy. In addition, the user can create certain words in the thesaurus database that should be replaced or deleted from a particular rule or relationship (e.g., removing "fast" from a relationship including "speed" and "quick"). A user can create a relationship between two or more valid thesaurus terms by entering a primary thesaurus term and all desired related terms in appropriate field of the Thesaurus display. A relationship between two or more valid thesaurus terms may be removed in a similar manner.

The Thesaurus display also may allow users to enter notes and history information regarding a particular term or relationship between terms. To the extent any changes or additions of notes and/or historical information impacts the hierarchical order of the thesaurus terms and relationships, the hierarchy may be automatically reordered to reflect such changes. In addition, a user can search for a thesaurus term through the Thesaurus display simply by entering the term in the appropriate field on the Thesaurus display. Thesaurus software module 250 will then retrieve all of the terms in the database that are related to the entered term. Search terms may be truncated to yield a broader range of results.

Any changes to the thesaurus database are updated and used to create and modify rules for generating suggested indexing terms (step 730). A trial index of suggested terms is then created (step 740). The trial index is then forwarded to an index editor which may modify or add terms to the thesaurus based on new or modified rules (step 750). A final index is then created with the updated thesaurus changes (step 760). Database design and maintenance software 190 then compares the final index with the trial index (step 770) to determine any changes (step 780). The changes are then forwarded to step 730. The foregoing iteration preferably continues to constantly upgrade the knowledge base of system 100.

Figure 8:
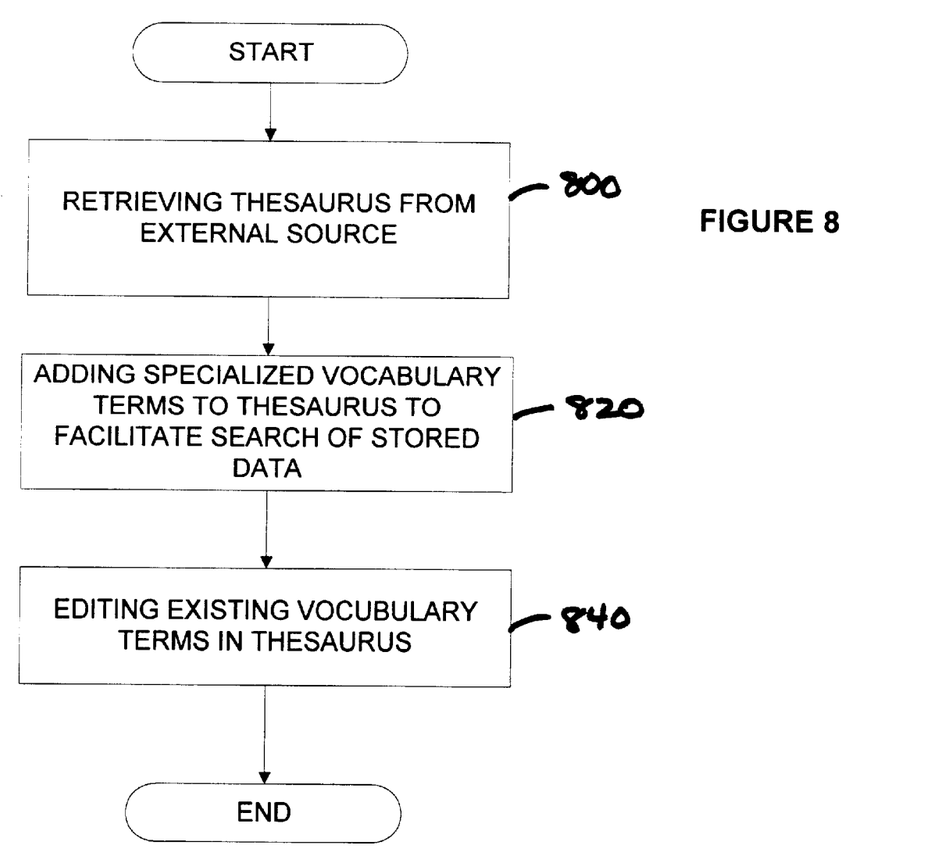
FIG. 8 is a flowchart of a method for implementing a thesaurus component of the database design and maintenance system consistent with the present invention.

FIG. 8 is a flowchart of a method for implementing thesaurus software module 250 of database design and maintenance system 100 consistent with the present invention. The method begins with retrieving a thesaurus from an external source (step 800). The "external source" may include thesaurus terms manually entered into system 100 or a thesaurus imported from an external location. Specialized vocabulary terms are then added to the thesaurus database for inclusion in rules to facilitate a search for stored data (step 820). In addition to adding terms to the thesaurus, the vocabulary terms and/or their relationships may be edited to reflect changes in indexing terms (step 840). These edited terms and/or relationships may also be used to create or modify existing rules for suggesting indexing terms to a user.

Embodiments consistent with the present invention provide a database design and maintenance system that assist users with creating, storing, updating and reusing full-text and bibliographic databases. The software suite includes an intranet system for document entry, editing, and viewing, an indexer for concept extracting, statistical collecting, and rule building functionality, and a thesaurus for allowing users to write and manage their own vocabulary of specialized terms, or expand upon an existing thesaurus employed in the database production and maintenance system. These components of the software suite may operated independently or be integrated to provide seamless performance in database design and maintenance.

While only some embodiments and methods consistent with the present invention have been described, those skilled in the art will understand that various changes and modifications may be made to these embodiments, and equivalents may be substituted for elements in these embodiments, without departing from the true scope of the invention.

In addition, many modifications may be made to adapt a particular element, technique or implementation to the teachings of the present invention without departing from the central scope of the invention. Therefore, this invention should not be limited to the particular embodiments and methods disclosed herein, but should include all embodiments falling within the scope of the appended claims.

I claim:

1. A database design and maintenance system, comprising:

a database management means for storing textual data in a storage device, the database management means having a user interface to facilitate entry, editing and viewing of the textual data;

an indexing means in communication with the database management means for indexing the textual data entered into the database management means, wherein indexing terms are assigned to the textual data by human indexers;

a thesaurus means distinct from the database management means for managing a vocabulary of the indexing terms;

a concept extracting means for scanning the textual data and extracting one or more indexing terms from the textual data and suggesting the extracted indexing terms to the human indexer; and a rule building means for developing rules employed by the concept extracting means.

2. The system of claim 1 wherein the indexing means includes a statistical collecting means for analyzing and recording usage of the indexing term.

3. The system of claim 1 wherein the database management means includes an intranet.

4. The system of claim 1 wherein the database management means includes Java-enabled software.

5. The system of claim 1 wherein the database management means includes TCP/IP protocol for data transmission.

6. The system of claim 1 wherein the database management means includes extensible markup language.

7. The system of claim 1 wherein the database management means includes a graphical user interface.

8. The system of claim 7 wherein the graphical user interface includes a web browser.

9. A method for maintaining a database, comprising the steps of:

generating a graphical user interface;

receiving textual data;

determining at least one indexing term to associate with the textual data for storage and retrieval, wherein indexing terms are assigned to the textual data by human indexers;

displaying the at least one indexing term for user selection;

associating the selected indexing term with the textual data;

storing the textual data in a storage device;

automatically extracting means for scanning the textual data and extracting one or more indexing terms from the textual data and suggesting the extracted indexing terms to the human indexer; and automatically developing rules employed by the concept extracting means.

10. The method of claim 9 wherein the determining step includes the step of extracting a term from the textual data indicating the subject matter of the textual data.

11. The method of claim 9 wherein the determining step includes the step of developing a rule to search for the data when stored.

12. The method of claim 9 wherein the generating step includes the step of creating at least one input field for receiving textual data.

13. The method of claim 11 wherein the developing step includes the step of associating at least one of a plurality vocabulary terms with the rule.

14. The method of claim 11 wherein the developing step includes the step of updating a working knowledge base with a rule.

15. The method of claim 11 wherein the developing step includes the step of updating a working knowledge base with a vocabulary term.

16. The method of claim 9 further comprising the step of creating reports of indexing terms.

* * * * *